United States Patent [19]

Houssian

[11] Patent Number: 5,735,068
[45] Date of Patent: Apr. 7, 1998

[54] PICTURE FRAMES

[75] Inventor: Vazgen John Houssian, Union City, N.J.

[73] Assignee: Esselte Pendaflex Corporation, Paramus, N.J.

[21] Appl. No.: 638,692

[22] Filed: Apr. 26, 1996

Related U.S. Application Data

[63] Continuation-in-part of Ser. No. 479,116, Jun. 7, 1995, abandoned.

[51] Int. Cl.⁶ .................................................... B44C 5/02
[52] U.S. Cl. ............................ 40/784; 40/782; 403/401
[58] Field of Search ........................ 40/782, 783, 784, 40/785; 403/401

[56] References Cited

U.S. PATENT DOCUMENTS

| | | | |
|---|---|---|---|
| 1,015,518 | 1/1912 | Staren | 40/783 |
| 2,804,952 | 9/1957 | Nothdurft | 403/401 X |
| 3,849,920 | 11/1974 | Trowbridge | 40/784 |
| 4,192,624 | 3/1980 | Bucci | 403/401 X |
| 4,820,077 | 4/1989 | Sawada et al. | 40/785 X |

Primary Examiner—Kenneth J. Dorner
Assistant Examiner—Andrea Chop
Attorney, Agent, or Firm—Darby & Darby

[57] ABSTRACT

Quick-assembly picture frames constructed from mitered frame sections (2) have unsightly join lines (6) at their corners. The appearance of such frames is enhanced by fitting a decorative corner unit (8) onto the frame corners which conceals join line (6). The corner unit is secured to the frame e.g. by tightening a grub-screw threaded through a wall (12) of the unit (8) against the rear surface (5) of the frame.

5 Claims, 1 Drawing Sheet

PICTURE FRAMES

This is a continuation-in-part of application Ser. No. 08/479,116, filed Jun. 7, 1995, now abandoned.

FIELD OF THE INVENTION

This invention relates to picture frames and more particularly to quick-assembly type picture frames. The term picture frames is used herein generically to refer to frames for framing pictures, photographs, artwork, postcards or the like.

BACKGROUND TO THE INVENTION

Quick-assembly picture frames, consisting of frame sections and means for securing the ends of adjacent sections to construct a complete frame, have been known for many years. Typically, such frames are formed from mitred elongate sections of an extruded metal such as aluminum or an aluminum alloy, each section having a rearwardly facing channel in it. To assemble such frames, the ends of adjacent sections are brought together forming a mitre joint which defines each corner of the frame, whereby the channels of the adjacent sections meet to form an L-shaped configuration at the rear of each corner of the frame. The adjacent frame sections are connected by inserting and securing an L-shaped bracket into each L-shaped channel defined by the joined adjacent frame sections. Each section also has a channel into which the edges of a stack of, e.g. backing board, artwork, mounting board and glass cover, may be received, the stack being held together when the frame is assembled round it.

The problem with such quick-assembly frames is the difficulty in ensuring that the edges of adjacent frame sections fit flush together. Often the assembled frames have gaps at the junctions between adjacent frame sections which detracts from the appearance of such frames from the front.

U.S. Pat. No. 3,965,601 describes an improve quick-assembly picture frame where the L-shaped brackets and channels are formed in a manner such that the securing of the brackets to the channels causes the adjacent frame sections to pivot slightly about their lengths drawing the forwardly facing, corner-defining regions of adjacent frame sections tightly together.

However, in view of the sectional nature of quick-assembly picture frames, no matter how tightly the adjacent sections are made to fit together, an unsightly join line is always visible at each corner of the assembled frame. Furthermore, over time and particularly after disassembling and reassembling the frame repeatedly, the joints between the adjacent sections tend to loosen and gape.

The present invention overcomes these problems by providing a picture frame which includes a structure that simultaneously conceals the join lines where adjacent frame sections meet and enhances the appearance of the frame.

GENERAL DESCRIPTION OF THE INVENTION

According generally to the present invention there is provided, in a picture frame comprising a plurality of frame sections and a plurality of connection members securing adjacent frame sections together at their ends, whereby each junction of adjacent frame sections defines a corner of the frame, the improvement comprising the provision of a plurality of corner units covering each junction, each corner unit comprising opposing front and rear walls, two adjacent side walls connecting said front and rear walls, the front and rear walls being adapted to overlay front and rear surfaces of the frame respectively and the side walls being adapted to overlay a side face of the frame, and means for securing the unit to the frame associated with at least one wall of the corner unit.

To enhance the appearance of the frame, it is preferred that at least the exposed surface of the first wall of the unit has a design feature configured thereon. The design feature may be, for example, a decorative relief impression in the surface of one or more walls of the unit, a pattern simply applied to the surfaces of the unit or an applied or integrally moulded decorative relief structure, depending upon the effect desired.

The corner units may be composed of any suitable material or combination of materials, for example plastics, wood and metal. Most preferably the corner units are die cast from resilient metal alloys such as zinc alloys. Such metals are favoured as they are particularly suitable for metal moulding and ornamentation of the moulded metal surfaces by die casting. The corner units may have a wide variety of surface finishes for example by coating, anodising or plating. Accordingly it will be appreciated that the possible styles and designs of the corner units of the present invention are extremely varied. In the preferred embodiment, the side walls of the corner unit include slight recesses adjacent the corner to provide a flush fit between the unit and the frame.

Conveniently the means for securing the unit to the frame is provided by at least one internally screw threaded aperture through at least one wall of the corner unit which receives a grub-screw (also known as a set screw) for tightening against an abutment surface associated with the frame. This abutment surface is preferably a surface of a frame section or a surface of a connection member forming part of the frame.

Preferably the second wall of the corner unit has associated therewith the means for securing the unit to the frame. In this way the securing means is not visible from the front of the frame when the frame is in use.

The picture frame of the present invention may be conveniently sold as a kit comprising frame sections, connecting members and corner units providing a quick-assembly modular framing system. Corner units of a corresponding shape and size but having a different finish, surface ornamentation etc., may be interchanged to alter and update the appearance of a frame simply if desired.

According to a further feature of the present invention there is provided a kit for a picture frame comprising a plurality of frame sections and connecting members, adjacent frame sections being adapted to be secured together by the connecting members forming junctions to construct the frame, whereby each junction of adjacent frame sections defines a corner of the frame and wherein the kit includes a plurality of corner units for overlaying each junction, each corner unit comprising opposing first and second walls connected by two adjacent side walls, the first and second walls being adapted to overlay a front and rear face of the frame respectively and the side walls being adapted to overlay a side face of the frame, at least one wall of the unit having associated therewith means for securing the unit to the frame.

According to a further feature of the present invention there is provided a corner unit for overlaying a junction in a picture frame composed of connected frame sections, the corner unit comprising opposing first and second walls connected by two adjacent side walls, the first and second walls being adapted to overlay a front and rear face of the frame respectively and the side walls being adapted to overlay a side face of the frame, at least one wall of the unit having means associated therewith for securing the unit to the frame.

DESCRIPTION OF PREFERRED EMBODIMENTS

This invention will now be described by way of example with reference to the accompanying drawings in which.

Figure 1:
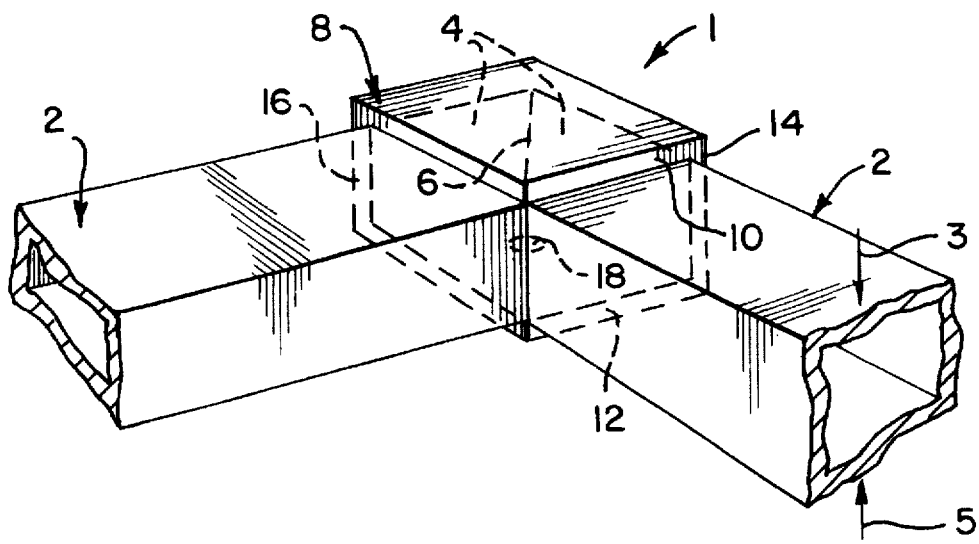
FIG. 1 shows a perspective view of a corner of a picture frame assembled in accordance with the present invention.

With reference to FIG. 1, this shows diagrammatically a typical corner region 1 of a picture frame constructed from adjacent mitred frame sections 2. The front and rear faces of the frame sections are indicated by arrows 3 and 5 respectively. The mitred ends 4 of the frame sections 2 are secured together forming a mitre joint 6 which defines a corner of the frame. The means of connecting the adjacent frame sections 2 has not been shown in the Figure for clarity, but typically an L-shaped bracket is inserted and secured into adjacent channels of adjacent frame sections 2 as described in the U.S. Pat. No. referred to above.

A corner unit 8 overlays the corner of the frame concealing the mitre joint 6. The corner unit consists of front and rear walls 10 and 12, respectively connected by two adjacent side walls 14 and 16. Wall 12 has an internally screw-threaded aperture through it (not shown). The corner unit is orientated and fitted over the corner of the frame so that the apertured rear wall 12 overlays the rear face 5 at the corner region of the frame and front wall 10 overlays the front face 3.

The corner unit is secured to the frame by a set screw 18 which is threaded through the aperture of wall 12 of the corner unit. The screw 18 is tightened to bear firmly against the bracket (not shown) connecting the adjacent frame sections 2. Tightening of the set screw 18 urges the wall 10 firmly against the front face 3 of the frame 1. In this manner the front wall 10 of the unit fits flush against the front face 3 of the frame 1 and conceals the underlying mitre joint 6 of the adjacent frame sections 2.

As indicated above, in the preferred embodiment the corner unit is die cast from a metal alloy such as a zinc alloy. The procedure for die casting units of this type is well known and, therefore, is not described herein in detail. By the nature of a die casting operation, the inside corner 21 of the unit is slightly rounded. As a result, the corner unit will not fit flush on the mitred edges of the frame sections 2. From an aesthetic point of view, it is important that the corner unit fit flush so that it appears as part of a unitary frame and not a separate element that was added to cover the edge.

According to a further feature of the invention, the die cast corner unit is provided with recesses 22 and 24 in walls 14 and 16, respectively. Because of these recesses 22 and 24, the inside corner 21 of the corner unit is displaced from the mitred edges of the frame sections 2. This creates a small gap between the side walls 14, 16 and the adjacent frame sections 2 in the regions of the recesses. As a result, the unrecessed regions of the corner unit fit flush against the frame. If the dimensions of the corner unit are properly selected, this means that there will be no space between the walls of the corner unit and the adjacent frame sections which, in turn, means that the frame has the appearance of a single unitary member to an observer.

A further benefit of the preferred embodiment of the invention as described is that if the edges of the corner sections are slightly misaligned, the recessed portions 22 and 24 will enable the corner unit to fit flush against the corner sections and thereby hide the imperfection in the frame.

Figure 2:
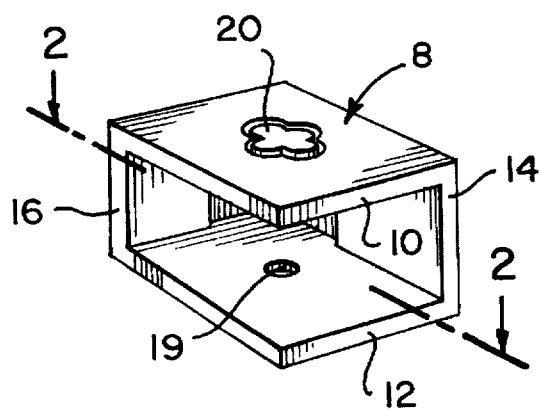
FIG. 2 shows a perspective view of a further embodiment of the corner unit of FIG. 1.
Figure 3:
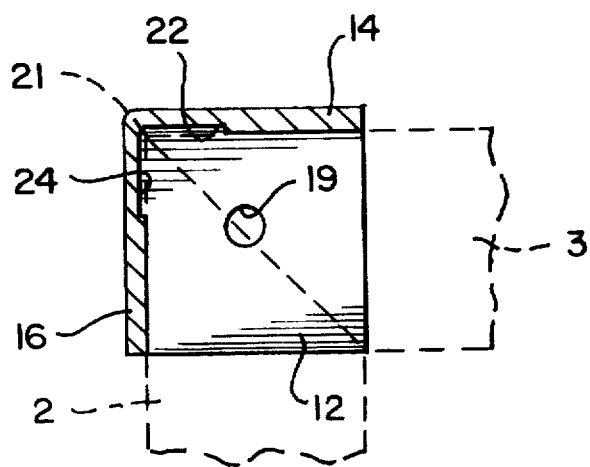
FIG. 3 is a top sectional view showing how the mitred edges of the frame fit into a corner unit according to the preferred embodiment of the invention.

The corner unit 8 clearly improves the appearance of such quick assembly frames by concealing the mitre joint 6, however the appearance may be enhanced further by the use of decorative corner units as shown, for example, in FIG. 2. This unit is the result of casting a metal alloy into a metal mould which defines the walls 10, 12, 14 and 16, aperture 19 and surface ornamentation 20 on the exposed surface of wall 10.

The corner unit of the present invention clearly enhances the appearance of quick-assembly frames both by concealing the unsightly mitre joint 6 between adjacent frame sections 2 and by providing an ornament at each corner of the frame.

I claim:

1. A one piece corner unit for overlaying a mitred joint of a picture frame composed of mitred frame sections, said corner unit comprising opposing front and rear walls connected by two adjacent side walls, said front and rear walls being adapted to overlay said front and rear faces of the frame, respectively, said front wall being shaped to overlay and cover substantially the entire mitre joint and said side walls being adapted to overlay a side face of the frame, said side walls having inner adjacent and adjoining surfaces, each inner surface having a recess with a recess base defined therein, said recesses extending from the junction of the side walls so that a gap exists between said recess bases and said inner surfaces of said side walls in the regions of said recesses, at least said rear wall of said corner unit having means associated therewith for securing said unit to the frame.

2. A one piece corner unit according to claim 1, wherein said means for securing comprises a threaded hole through which a set screw can be inserted, and wherein the front and side walls are free of any means for securing the corner unit to the frame.

3. A one piece corner unit according to claim 2, wherein the unit is die cast from metal or a metal alloy.

4. A picture frame comprising four mitred frame sections and a one piece corner unit according to claim 1 at each of the mitred joints of the picture frame.

5. A picture frame according to claim 4, wherein each of the frame sections are made of metal or a metal alloy, and each of the corner units is die cast from metal or a metal alloy.

* * * * *